March 4, 1930.　　H. T. THOMAS　　1,749,453
MOTOR VEHICLE FENDER
Filed May 19, 1924　　2 Sheets-Sheet 1
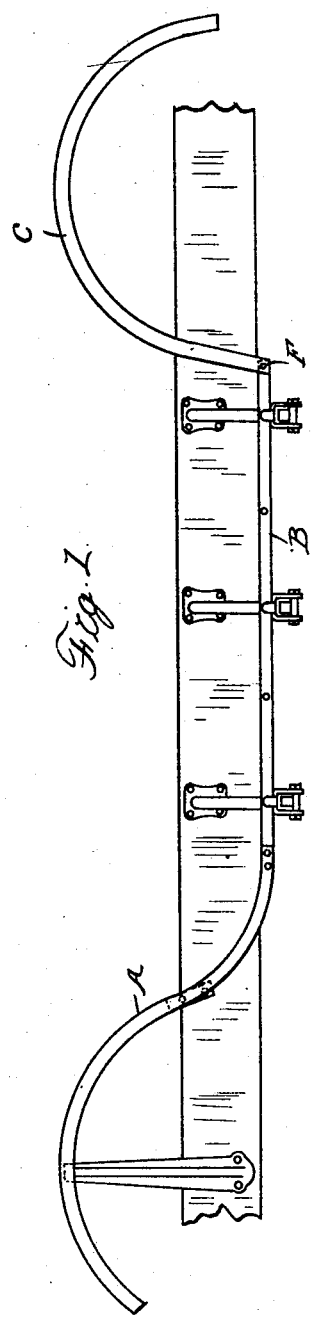
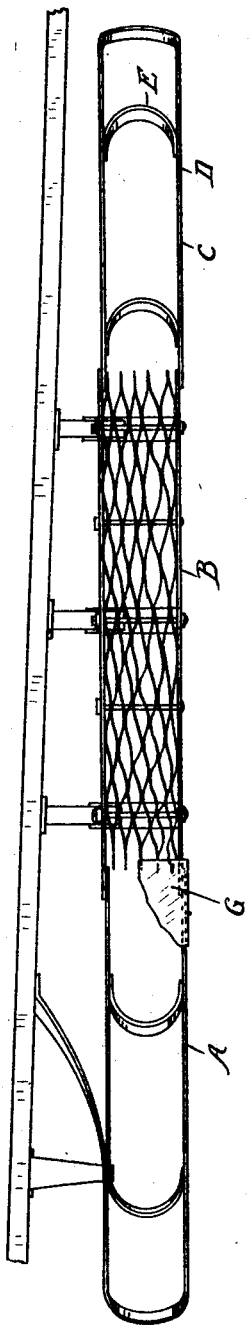
Inventor
Horace T. Thomas
By Whittemore Hulbert Whittemore
 & Belknap　Attorneys

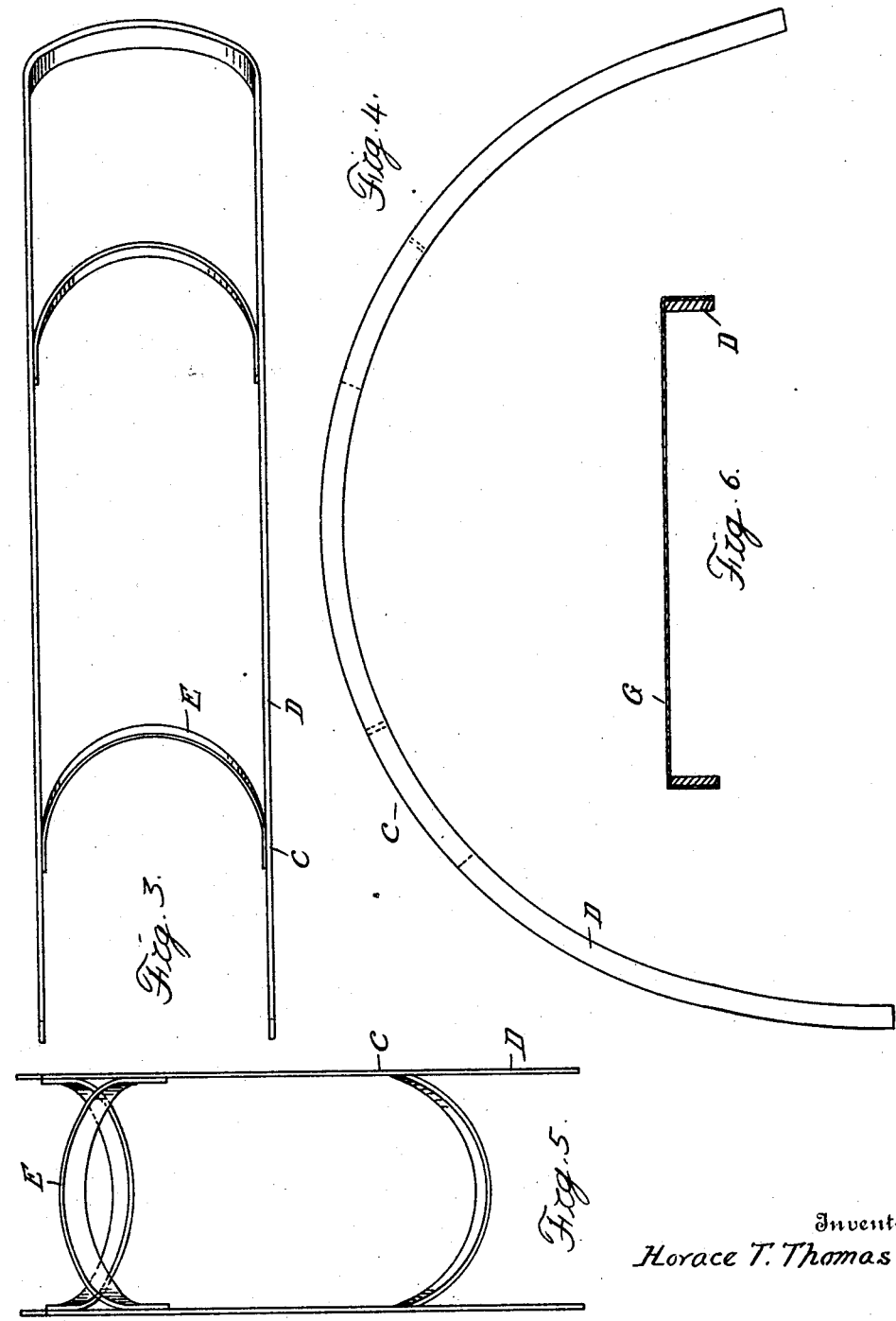

Patented Mar. 4, 1930

1,749,453

UNITED STATES PATENT OFFICE

HORACE T. THOMAS, OF LANSING, MICHIGAN, ASSIGNOR TO REO MOTOR CAR COMPANY, OF LANSING, MICHIGAN, A CORPORATION OF MICHIGAN

MOTOR-VEHICLE FENDER

Application filed May 19, 1924. Serial No. 714,508.

The invention relates to fenders for motor vehicles, and has for its object the obtaining of a construction which affords a certain degree of protection to the car body in addition to its usual function of a wheel guard. It is a further object to facilitate quick repairs at small expense, and still further to obtain other advantages as hereinafter set forth.

This application is a companion case to my copending application Serial No. 714,507.

In the drawings:

Figure 1 is a side elevation showing my improved construction of fender in connection with the running board of a motor vehicle;

Figure 2 is a plan view thereof;

Figures 3, 4 and 5 are respectively a plan view, a side elevation and an end elevation of the rear fender frame;

Figure 6 is a cross section of a frame with the cover in place.

In the present state of the art it is usual to manufacture fenders of pressed sheet metal varying in gauge and strength, but in all cases substantially non-resilient. In case of collision the fender is usually bent out of shape, and it is often difficult to restore the same to its original condition. The metal is practically non-resilient and is insufficient in strength to absorb any considerable portion of the shock so that but little protection is afforded to the wheels or other portions of the car.

In order that the fender may serve a further function of a guard or bumper for protecting the car, I have devised a construction comprising essentially a resilient frame and a cover therefor. This cover may be formed either of light gauge metal or of some flexible non-metallic material, such as molded rubber. In either case it forms an effective mud guard for the wheel and produces the desired finish, while the strength of the construction is solely in the frame.

In detail, A is the front fender, B the running board, and C the rear fender of a motor vehicle. Each fender is composed of a resilient frame D, preferably formed of bars of spring metal. As shown in Figures 3 to 5, these bars are suitably fashioned and are preferably formed with the front, rear, and one end portion continuous and integral. Additional cross bars E are placed at suitable intervals, and the free ends of the side bars may be attached to the running board, as indicated at F. G is the cover which is stretched over the frame D and secured thereto by any suitable means, not shown in detail.

With the construction as described in the ordinary operation of the car, the fender serves its usual function. If, however, there is an accident and a blow is struck against the fender, this will merely produce a deflection which, if within the elastic limit of the metal, will restore the original form upon release of pressure. In case the covering is of light gauge sheet metal this may be destroyed, but it is easily renewed at a small expense. On the other hand, if the covering is of flexible material such as molded rubber, it will not be injured.

It will be appreciated that a construction such as described saves the annoyance and the expense of replacement of fenders, but a still more important function is the protection that is afforded to other parts of the car. Thus, the resilient bars in yielding will often absorb a considerable part of the shock, as would not be the case with a rigid or non-resilient structure.

What I claim as my invention is:—

1. In a motor vehicle, the combination with a running board, of a fender comprising a continuous bar of resilient metal prefashioned to form the front, rear and one end of a border frame, with the ends of said bar connected to said running board, resilient cross bars arranged at intervals of said border frame and curved to provide a convex surface for said fender and a cover for said frame.

2. In a motor vehicle, a fender constituting a side bumper for the vehicle, said fender being substantially rigid in the direction of its length and depth to oppose deflection in these directions but being yieldable in the direction of its width to cushion lateral shocks.

3. In a motor vehicle, a fender including in combination a frame formed of spaced side bars substantially rigid in the direction of their length but yieldably movable toward and away from each other to absorb blows imparted to the side of the vehicle, and a covering for said frame.

4. In a motor vehicle, a fender constituting a side bumper for the vehicle, and including in combination a frame substantially rigid in the direction of its length but yieldable in the direction of its width, said frame being also substantially rigid in a direction at right angles to its length and width, cross members for said frame for yieldably bracing the same, and a cover for said frame.

5. In a motor vehicle, a fender constituting a side bumper for the vehicle, said fender comprising a frame work prefashioned to the shape of a fender and being rigid in the direction of its length and depth, but yieldable in the direction of its width, and a cover for said frame work.

In testimony whereof I affix my signature.

HORACE T. THOMAS.